US009760876B2

(12) United States Patent
Cao et al.

(10) Patent No.: US 9,760,876 B2
(45) Date of Patent: Sep. 12, 2017

(54) FLEXIBLY PRICING CLOUD COMPUTING SERVICES

(71) Applicant: Empire Technology Development LLC, Wilmington, DE (US)

(72) Inventors: Junwei Cao, Beijing (CN); Wei Chen, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 948 days.

(21) Appl. No.: 13/855,590

(22) Filed: Apr. 2, 2013

(65) Prior Publication Data

US 2014/0297491 A1    Oct. 2, 2014

(51) Int. Cl.
*G06Q 20/14* (2012.01)

(52) U.S. Cl.
CPC .................................. *G06Q 20/145* (2013.01)

(58) Field of Classification Search
None
See application file for complete search history.

(56) References Cited

U.S. PATENT DOCUMENTS 8,813,205 B2 *   8/2014   Deshmukh ........... H04L 63/0815
                                                       709/223
2014/0214496 A1 *   7/2014   Macbeath ............ G06Q 30/0283
                                                       705/7.37

FOREIGN PATENT DOCUMENTS

WO    2012173604 A2    12/2012

OTHER PUBLICATIONS

Inrastructure as a Service (IaaS), Copyright 2009 R & G Technologies, 2 pages, http://www.rgtech.com.au/infrastructure-as-a-service , last accessed Apr. 2, 2013.
The iFISH Group, Infrastructure as a Service, © 2012 by The iFish Group Inc., 2 pages.
Cloud Computing for Dynamics NAV (SaaS ERP), Microsoft Dynamics NAV for the Cloud or SaaS (Software as a service), copyright 2012, iCepts Technology Group, Inc., 3 pages, http://www.icepts.com/cloud-computing-dynamics-nav/ , last accessed Apr. 2, 2013.

* cited by examiner

*Primary Examiner* — Ryan Zeender
*Assistant Examiner* — Denisse Ortiz Roman
(74) *Attorney, Agent, or Firm* — Brundidge & Stanger, P.C.

(57) ABSTRACT

Technology is described for flexibly pricing cloud computing services. In some examples, the technology may receive at a cloud service provider a first set of information from an Internet service provider that provides an Internet service. The first set of information may relate to expected user behavior of a representative user of the Internet service provider. The technology may identify one or more computing resources employed by the Internet service provided by the Internet service provider and analyze the first set of information to determine a cycle. The cycle is a function of the computing resources expected to be employed by the representative user of the Internet service provider. The technology may compute a service fee for each instance of the cycle and allocates the service fee to the Internet service provider.

20 Claims, 7 Drawing Sheets

FLEXIBLY PRICING CLOUD COMPUTING SERVICES

BACKGROUND

Traditionally, Internet service providers needed to build data centers or use existing data centers to host server computing devices. Examples of Internet service providers include, e.g., on-line storage providers, on-line multi-media content providers, on-line retail stores, on-line analysis providers, etc. Building data centers can be expensive because data centers often have large numbers of resources (e.g., servers, memory, storage, etc.) and require an information technology infrastructure and personnel to manage the servers. Moreover, it can be difficult to find locations offering high network bandwidth and such locations may charge a premium. Furthermore, because Internet service providers often cannot predict usage when they first offer their services, they initially install too few resources or too many resources. If they install too few resources, their users may find the offered services to be sluggish or the services may even "crash" and so become temporarily unavailable. On the other hand, if they install too many resources, the Internet service providers incur costs unnecessarily.

To enable Internet service providers to flexibly adapt their consumption of computing resources, an increasing number of cloud computing services have become available. Cloud computing services generally provide computing resources (e.g., hardware and/or software) as a service over a network (e.g., the Internet). By using a cloud computing service, an Internet service provider can increase or decrease consumption of resources according to the demand for the services they offer, e.g., dynamically as the demand increases or decreases. Various cloud computing service providers, e.g., AMAZON's EC2/S3 or MICROSOFT's AZURE, can provide different types of cloud services, including Infrastructure as a service (IaaS), Software as a service (SaaS), Platform as a service (PaaS), Network as a service (NaaS), Storage as a service (STaaS), Security as a service (SECaaS), Desktop as a service (DaaS), Database as a service (DBaas), or Test environment as a service (TEaaS), to their customers, e.g., cloud computing service clients or Internet service providers.

Internet service providers are increasingly using cloud computing services, e.g., so that they do not need to build sophisticated data centers. Cloud computing service providers typically charge their customers ("cloud computing service clients") based on how much computing resources the customers have been allocated. Under such a payment scheme, customers who do not use all of the allocated resources still need to pay for the allocated resources.

Unless otherwise indicated herein, the materials described in this section are not prior art to the claims in this application and are not admitted to be prior art by inclusion in this section.

SUMMARY

In some embodiments, the disclosed technology can receive at a cloud computing service provider ("cloud provider" or "cloud service provider") a first set of information from an Internet service provider ("cloud client") that provides an Internet service. The first set of information relates to expected user behavior of a representative user of the Internet service provider. The technology can identify one or more computing resources employed by the Internet service provided by the Internet service provider and analyze the first set of information to determine a cycle. The cycle is a function of computing resources expected to be employed by the representative user of the Internet service provider. The technology can further compute a service fee for each instance of the cycle and allocate the service fee to the Internet service provider in response to detecting an occurrence of a cycle at a computing device assigned by the cloud service provider to the Internet service provider.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is described for flexibly pricing cloud computing services ("the technology"). In various embodiments, the technology can provide customized cloud service rates to Internet service providers (or "cloud clients") by analyzing user behavior of the Internet service providers. The term "user" refers to a customer who subscribes to Internet services provided by Internet service providers e.g., by visiting their websites. More particularly, the technology provides a "pay-per-cycle" payment scheme for cloud computing services. The cycle can vary across different types of businesses, websites, etc.

In various embodiments, the technology can analyze resource usage of a particular Internet service provider and then calculate a customized "cycle" for that Internet service provider. The term usage can mean employing one or more computing resources, such as processors, memories, storage devices, network communication devices, input/output devices, etc. A cycle is a function of the computing resources expected to be employed by the representative user of the Internet service provider. In some embodiments, a cycle can be defined as a basic unit of computing resources employed by a representative user of an Internet service provider. In other words, the cycle can vary from different types of businesses (or websites) in which Internet service providers are involved. For example, for an Internet storage service provider, the cycle could reflect the feature of its business, such as requiring more storage space than other types of computing resources. For another example, for an Internet multi-media content provider, a cycle can employ more network bandwidth than other types of resources. The data that the technology uses for this analysis can be gathered or generated by the cloud service providers. After analyzing sufficient data, the technology can identify multiple cloud service packages, which may be generated based on different types of businesses (or websites), for Internet service providers to choose from. For example, the technology can provide a High-Bandwidth package, a High-Processing package, and/or a High Storage package. After determining the cycle and traffic (e.g., how many users visited within a website specified period of time) of the Internet service provider, the technology can compute a service fee based on the cycle and the traffic. Alternatively, the technology can provide several fee packages for the Internet service provider to choose from. The Internet service provider can then make a cost-effective purchase decision for cloud services from the cloud provider.

In various embodiments, the technology also enables cloud providers to monitor the traffic (e.g., the network traffic or user visits) of the Internet service providers that employ the cloud provider's cloud computing services. For example, if the cloud provider identifies a change in the Internet service provider's traffic (e.g., a peak or surge in the number of user logons, visits to a website operated by the Internet service provider, etc.), the cloud provider can notify the Internet service provider to, for example, upgrade or modify its cloud computing service. Alternatively, the cloud provider can directly allocate computing resources to the Internet service provider. The technology may also provide tools to manage relationships between cloud providers and Internet service providers. By automatically analyzing Internet service providers' cycles and monitoring their traffic, the technology can enable cloud providers to cultivate relationships between cloud providers and Internet service providers. In addition, the cloud providers can improve their service quality by allocating computing resources efficiently, and the Internet service providers can purchase suitable cloud services without committing unnecessary waste.

Figure 1:
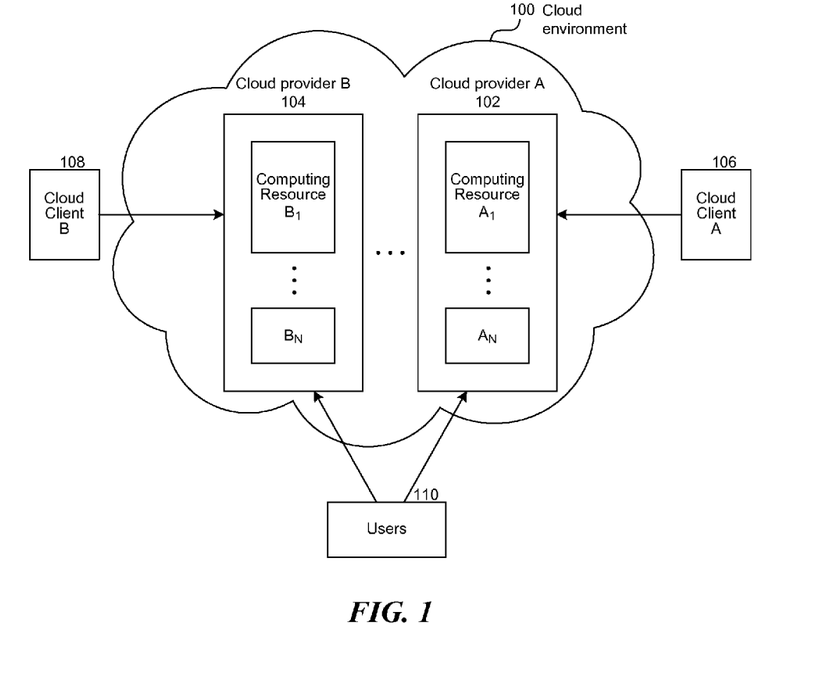
FIG. 1 is a block diagram illustrating a cloud environment in which the disclosed technology may operate in various embodiments.

Turning now to the figures, FIG. 1 is a schematic block diagram illustrating a cloud environment 100 in which the disclosed technology can operate in various embodiments. As illustrated in FIG. 1, the cloud environment 100 can include multiple cloud service providers, such as a cloud provider A 102 and a cloud provider B 104. In other embodiments, there can be more than two cloud service providers in the cloud environment 100. As illustrated in FIG. 1, the cloud provider A 102 can include computing resources $A_1$-$A_N$, and the cloud provider B 104 can include computing resources $B_1$-$B_N$. Internet service providers, such as a cloud client A 106 and a cloud client B 108, can employ cloud computing services (e.g., "renting" computing resources) from the cloud service providers and provide Internet services (e.g., an on-line storage service) to users 110 (e.g., those who purchase the on-line storage service provided by the Internet service provider). As illustrated in FIG. 1, for example, the cloud client A 106 can provide its Internet service to the users 110 using the cloud provider A 102, whereas the cloud client B 108 can provide its Internet service to the users 110 using the cloud provider B 104. The users 110 can employ computing devices (not illustrated) that are connected to the Internet, an intranet, or other network, to which the cloud environment 100 is also connected.

Figure 2:
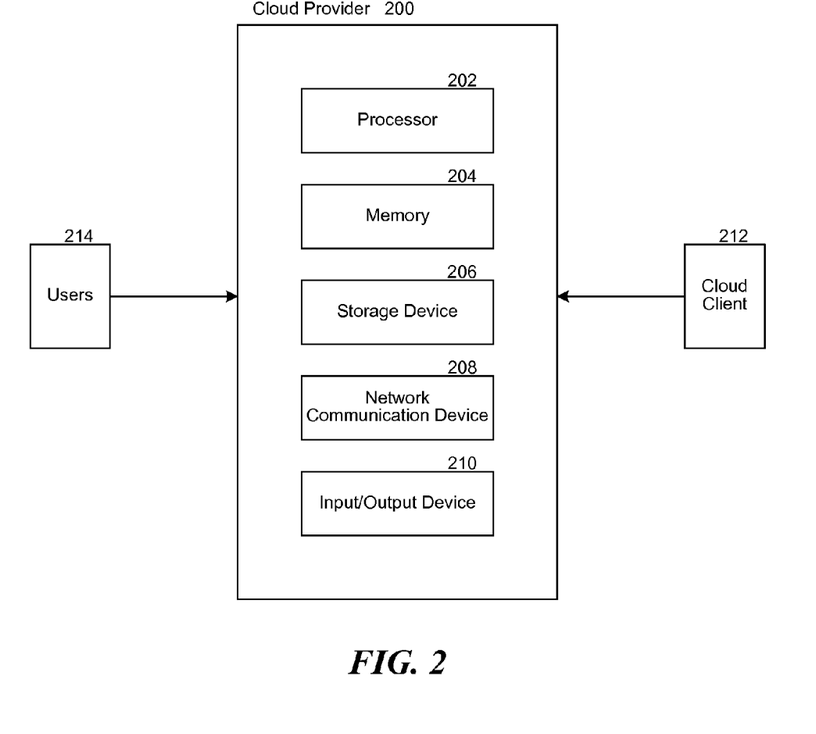
FIG. 2 is a block diagram illustrating a cloud computing service provider employed by the disclosed technology in various embodiments.

FIG. 2 is a schematic block diagram illustrating a cloud computing service provider 200 employed by the disclosed technology in various embodiments. As illustrated in FIG. 2, a cloud computing service provider 200 can provide various types of computing resources, including, for example, a processor 202, a memory 204, a storage device 206, a network communication device 208, and/or an input/output device 210. In other embodiments, the computing resources can include other suitable devices. As illustrated in FIG. 2, a cloud client 212 can employ the computing resources provided by the cloud computing service provider 200 while providing its Internet service to users 214.

Figure 3:
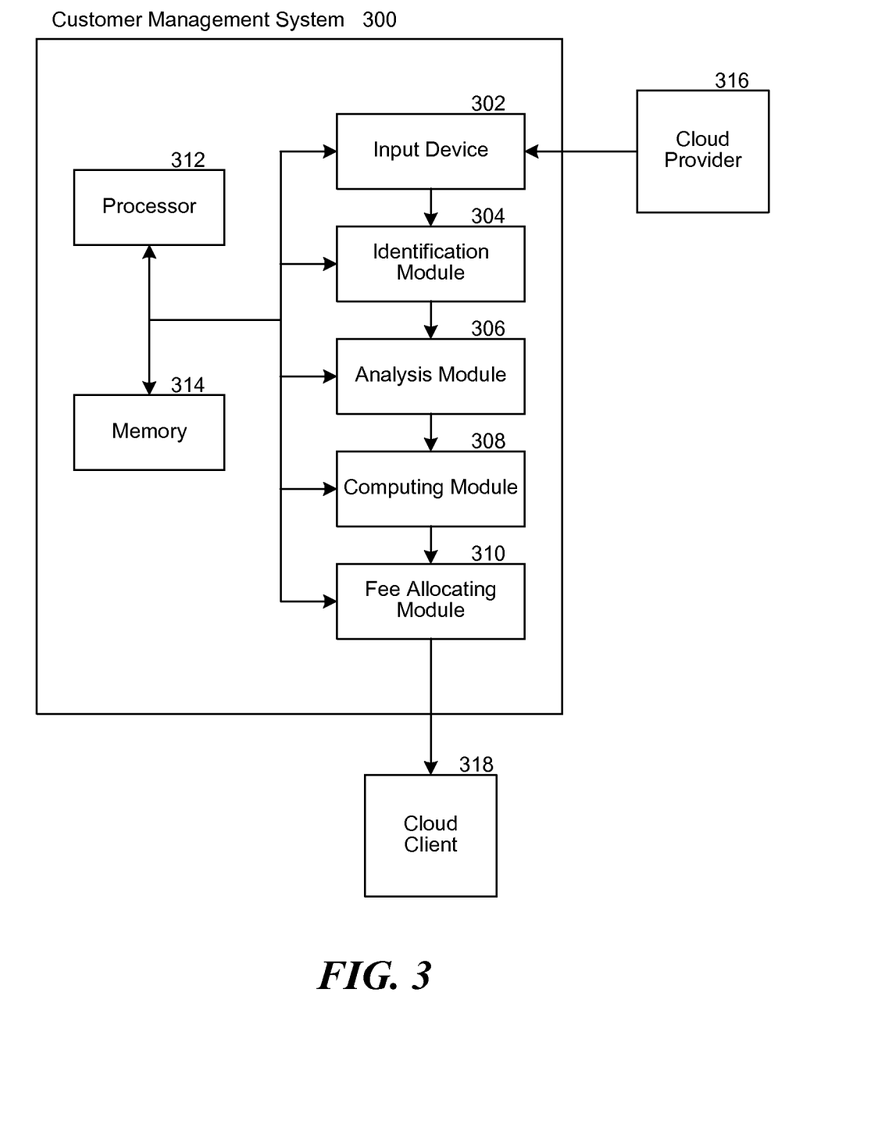
FIG. 3 is a block diagram illustrating an illustrative embodiment of the customer management system in accordance with the disclosed technology.

FIG. 3 is a schematic block diagram illustrating an illustrative embodiment of a customer management system 300 in accordance with the disclosed technology. As illustrated in FIG. 3, the customer management system 300 can include an input device 302, an identification module 304, an analysis module 306, a computing module 308, a fee-allocating module 310, a processor 312, and a memory 314. As illustrated in FIG. 3, the processor 312 and the memory 314 can be coupled to other device/modules in the customer management system 300. The input device 302 can be configured to receive a first set of information from a cloud provider 316. The first set of information may relate to expected user behavior of a representative user of the Internet service provider, such as the cloud client 318. For example, the first set of information can include information about or regarding the representative user's time or duration of utilizing the Internet service (e.g., making a purchase of products) provided by the Internet service provider for one user visit (e.g., each logon of the Internet service provider's website). In some embodiments, the expected user behavior of the representative user can be determined by arithmetic mean calculation, median calculation, and/or other suitable statistic methods. In the illustrated embodiment, the cloud provider 316 can record the first set of information of multiple Internet service providers (e.g., including the cloud client 318). As illustrated in FIG. 3, the first set of information can be transmitted to the input device 302 of the system 300.

As illustrated in FIG. 3, the identification module 304 can be configured to identify one or more computing resources (e.g., as those illustrated in FIG. 2) employed by the Internet service that is provided by the Internet service provider. The analysis module 306 can be configured to analyze the first set of information to determine a cycle for the Internet service provider. A cycle is a function of the computing resources expected to be employed by the representative user of the Internet service provider. In some embodiments, a cycle can be defined as a basic unit of computing resources employed by a representative user of an Internet service provider. In other words, the cycle can vary from different types of businesses (or websites) in which Internet service providers are involved. For example, for an Internet storage service provider, the cycle could reflect the feature of its business, namely requiring more storage space than other types of computing resources. For another example, for an Internet multi-media content provider, a cycle can employ more network bandwidth than other types of resources. In some embodiments, the analysis module 306 can be further configured to determine an average usage amount of the computing resources actually employed by the Internet service provided by the Internet service provider. The analysis result can be used as a benchmark or reference for determining the cycle for a similar entity (e.g., an Internet service provider from a foreign country).

In various embodiments, the computing module 308 can be configured to compute a service fee for each instance of the cycle. For example, if an Internet service provider is an on-line storage provider, the cycle can be determined as requiring computing resources of 10 KB/S bandwidth, 0.01 CPU (e.g., allocating 1% calculation capacity of a specified type of Central Processing Unit within a specified period of time), 10 MB memory, and 1 GB storage per user visit. After the cycle is determined, the computing module 308 can further compute a total service fee of the cloud service by multiplying the cycle with the traffic (or expected traffic) or the number of user visits (or expected number of user visits). In some embodiments, the traffic of the Internet service provider can be defined as the number of user visits within a predetermined period of time (e.g., a day or a month). With the traffic information of the Internet service provider, the customer management system 300 can provide a cycle-based fee estimation that is approximately equal to the computing resources expected to be actually employed by the Internet service provider, and thus allows the Internet service provider to make a cost-effective purchase decision for the cloud computing service.

The fee-allocating module 310 can be configured to allocate a service fee to the Internet service provider. In various embodiments, the fee-allocating module 310 can allocate the service fee in response to detecting an actual cycle at a computing device (e.g., a storage device or a dedicated server) assigned by the cloud service provider to the Internet service provider. In some embodiments, the customer management system 300 can further include a monitoring module (not illustrated) and an adjusting module (not illustrated). The monitoring module can be configured to monitor the computing device assigned by the cloud service provider, and the adjusting module can be configured to adjust the service fee based on a comparison of computing resources actually employed by the Internet service and the computing resources expected to be employed. For example, if an Internet service provider only utilizes 50% of the assigned computing resources, the monitoring module can detect this difference of non-use and notify the adjusting module. The adjusting module can accordingly adjust the service fee based on the detected difference. In some embodiments, the adjusting module can adjust the cycle of the Internet service provider. In other embodiments, the adjusting module can adjust the expected traffic or the number of user visits.

In some embodiments, the customer management system 300 can further include a service package module (not illustrated) configured to generate multiple cycle-based service fee packages from which the Internet service provider may choose. For example, the service package module can generate several fee packages based on results of the analysis module discussed above. The fee packages can be generated in accordance with different types of businesses (or websites) of the Internet service providers. More specifically, different Internet service providers may need different or customized cloud computing services to achieve various business goals. For example, an Internet service provider providing an on-line storage service may use more storage resources than other types of computing resources. As another example, an Internet service provider providing an on-line gaming service may use more processing resources than other types of computing resources while an Internet service provider providing VoIP services may use more communication resources than other types of computing resources. Accordingly, the customer management system 300 may generate different fee packages to meet the diverse needs of their customers, such as a High-Bandwidth package, a High-Processing package, and/or a High Storage package. For example, the High-Bandwidth package can provide a fee package for employing a unit of computing resources (e.g., per cycle) of: 100 KB/S bandwidth, 0.01 CPU (see the exemplary definition above), 10 MB memory, and 10 MB storage; the High-Processing package can provide a fee package of a cycle of: 10 KB/S bandwidth, 0.03 CPU, 10 MB memory, and 10 MB storage; the High Storage package can provide a fee package of a cycle of: 10 KB/S bandwidth, 0.01 CPU, 10 MB memory, and 1 GB storage. In other embodiments, the fee packages can have different arrangements of various types of computing resources.

Figure 4:
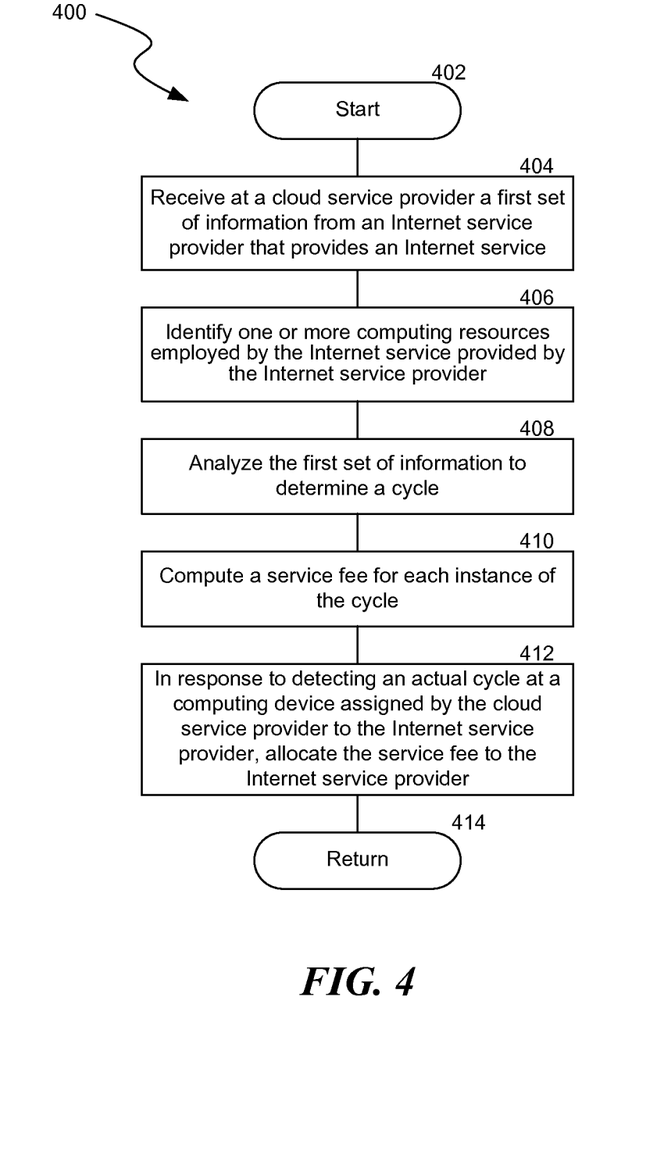
FIG. 4 is a flow diagram illustrating an embodiment of the customer management method in accordance with the disclosed technology.

FIG. 4 is a flow diagram illustrating an embodiment of a customer management method 400 in accordance with the disclosed technology. In some embodiments, the method 400 can be executed by a computing device associated with a cloud provider to compute service fees. The method 400 begins at block 402. The method 400 then continues at block 404, where it receives a first set of information from an Internet service provider. As discussed above, the first set of information can relate to expected user behavior of a representative user of the Internet service provider. In some embodiments, the expected user behavior of the representative user can be determined by arithmetic mean calculation, median calculation, or other suitable statistic methods. The cloud service provider can record and then transmit the first set of information of multiple Internet service providers for further processing.

The method 400 then continues at block 406, where it identifies one or more computing resources employed by the Internet service provided by the Internet service provider. The computing resources can include a processor, a memory, a storage device, a network communication device, an input/output device and/or other suitable devices. The method 400 then continues at block 408, where it analyzes the first set of information to determine a cycle of the Internet service provider. As discussed above, the cycle can be a function of the computing resources expected to be employed by the representative user of the Internet service provider and can be defined as a basic unit of computing resources employed by a representative user of an Internet service provider. In some embodiments, the method 400 can further include analyzing the first set of information to determine an average usage amount of the computing resources actually employed by the Internet service provided by the Internet service provider. The analysis result can be used as a benchmark or reference for determining the cycle of a similar entity (e.g., an Internet service provider from a foreign country).

After the Internet service provider's cycle is determined, the method 400 can compute a total service fee of the cloud service by multiplying the cycle with the traffic (or expected traffic) or the number of user visits (or expected number of user visits). The method 400 then continues at block 410, where it computes a service fee for each instance of the cycle. Using the traffic information of the Internet service provider, the method 400 can compute a cycle-based fee estimation that is close to the computing resources expected to be actually employed by the Internet service provider, and thus allows the Internet service provider to make a cost-effective purchase decision for the cloud computing service. The method 400 then continues at block 412, where it allocates the service fee to the Internet service provider in responsive to detecting an actual cycle at a computing device (e.g., a storage device or a dedicated server) assigned by the cloud service provider to the Internet service provider. The method 400 then returns at block 414.

In some embodiments, the method 400 can further include monitoring the computing device assigned by the cloud service provider, and adjusting the service fee based on a comparison of computing resources actually employed by the Internet service and the computing resources expected to be employed. For example, if an Internet service provider only utilizes 50% of the assigned computing resources, the method 400 can monitor and detect this difference and then the adjust the service fee accordingly (e.g., adjusting the cycle of the Internet service provider and/or adjusting the expected traffic or the number of user visits). In some embodiments, the method 400 can include generating multiple cycle-based service fee packages for the Internet service provider to choose from. For example, the method 400 can generate several fee packages based on the analysis result from the analysis of the first set of information, as discussed above. In some embodiments, the fee packages can be generated in accordance with different types of businesses of the Internet service providers. As discussed above, in some embodiments, the fee packages can include a High-Bandwidth package, a High-Processing package, and/or a High Storage package.

Those skilled in the art will appreciate that the logic illustrated in FIG. 4 and described above, and in each of the flow diagrams discussed below, may be altered in various ways. For example, the order of the devices or modules may be rearranged, the devices or modules may be performed in parallel, illustrated devices or modules may be omitted, other devices or modules may be included, etc.

Figure 5:
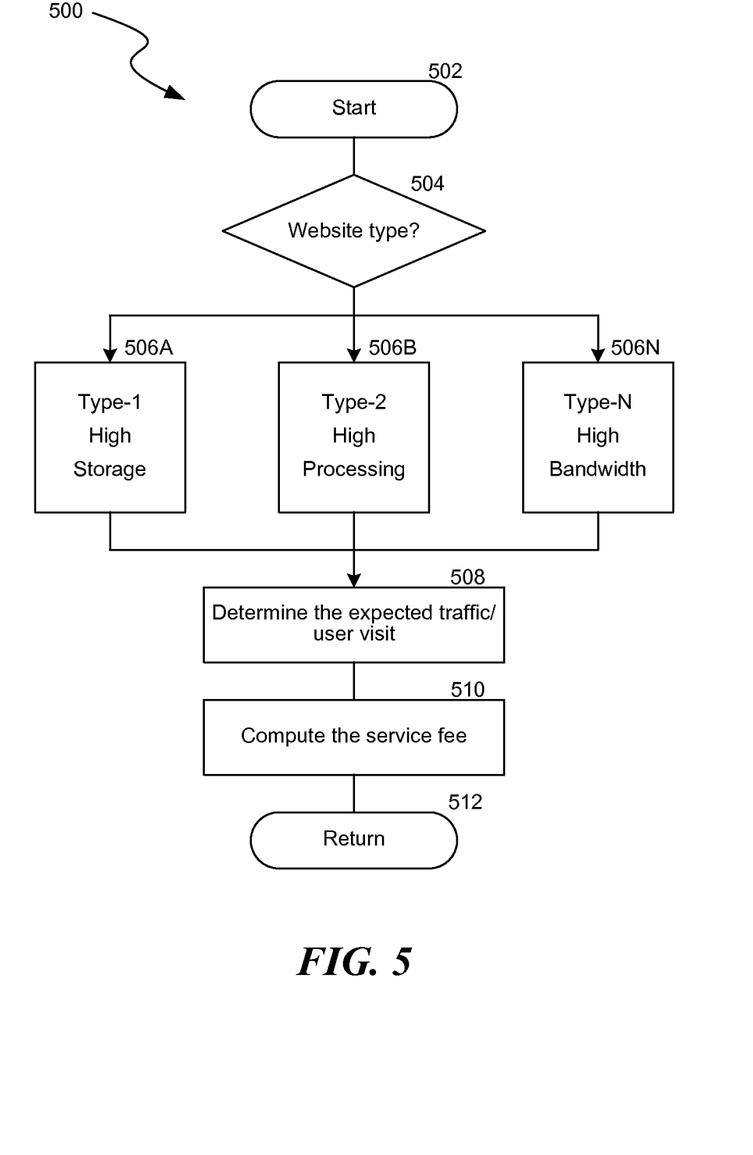
FIG. 5 is a flow diagram illustrating another embodiment of the customer management method in accordance with the disclosed technology.

FIG. 5 is a flow diagram illustrating another embodiment of a customer management method 500 in accordance with the disclosed technology. In some embodiments, the method 500 can be executed by a computing device. The method 500 begins at block 502. The method 500 then continues at block 504, where it enables an Internet service provider to choose a type of the website that is most relevant to the Internet service provided by the Internet service provider. The method 500 then continues at block 506, where it provides several types of cycles, including Type-1 High-Storage cycle 506A, Type-2 High-Processing cycle 506B, and Type-N High-Bandwidth cycle 506N, for different types of websites. For example, if the Internet service provider chooses the Type-1 High-Storage cycle 506A, the method 500 can provide a predetermined basic unit of computing resources, (e.g., 10K B/S bandwidth, 0.01 CPU, 10 MB memory, and 1 GB storage) employed by a typical Internet storage services provider.

The method 500 then continues at block 508, where it determines expected traffic (or user visits) of the Internet service provided by the Internet service provider. In some embodiments, the traffic can be received from sources such as the Internet service provider. In other embodiments, the method 500 can detect the traffic of the Internet service provider. The method 500 then continues at block 510, where it computes the service fee based on the chosen cycle and the traffic. Accordingly, the method 500 enables the Internet service provider to make a cost-effective purchase decision by selecting a suitable cycle of its website. In some embodiments, the method 500 can further include monitoring the computing device assigned by the cloud service provider and adjusting the service fee based on a comparison of computing resources actually employed by the Internet service and the computing resources expected to be employed. The method 500 then returns at block 512.

Figure 6:
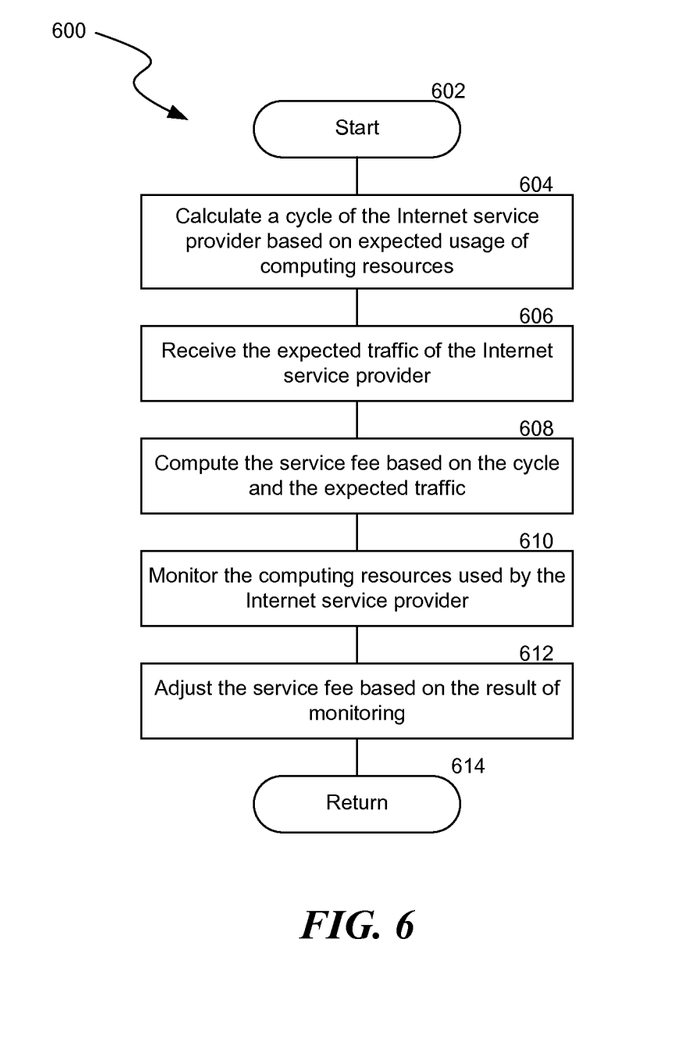
FIG. 6 is a flow diagram illustrating yet another embodiment of the customer management method in accordance with the disclosed technology.

FIG. 6 is a flow diagram illustrating yet another embodiment of a customer management method 600 in accordance with the disclosed technology. The method 600 begins at block 602. The method 600 then continues at block 604, where it calculates a cycle of the Internet service provider based on expected usage of computing resources. The method 600 then continues at block 606, where it receives the expected traffic of the Internet service provider. The method 600 then continues at block 608, where it computes resources actually used by the Internet service provider. The method 600 then continues at block 610, where it monitors the computing resources actually used by the Internet service provider. The method 600 then continues at block 612, where it adjusts the service fee based on the result of monitoring. The method 600 then returns at block 614. By monitoring the traffic of the Internet service provider and adjusting the service fee accordingly, the method 600 can provide a cycle-based fee that is close to the computing resources expected to be actually employed by the Internet service provider, and thus allows the Internet service provider to make a cost-effective purchase decision for the cloud computing service.

Figure 7:
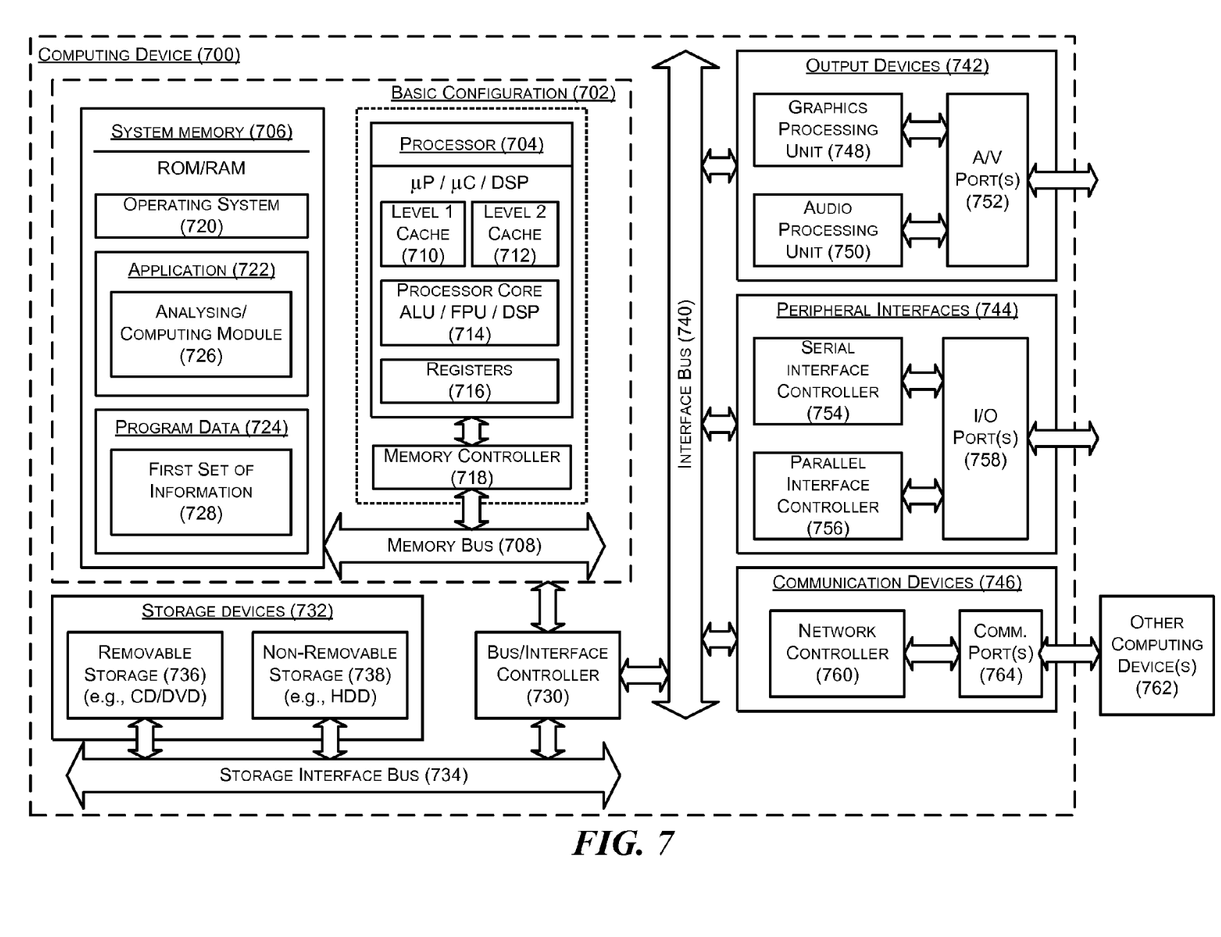
FIG. 7 is a block diagram illustrating an example computing device that is arranged in accordance with at least some embodiments of the present disclosure.

FIG. 7 is a block diagram illustrating an example computing device 700 that is arranged in accordance with at least some embodiments of the present disclosure. In a very basic configuration 702, the computing device 700 typically includes one or more processors 704 and a system memory 706. A memory bus 708 may be used for communicating between the processor 704 and the system memory 706.

Depending on the desired configuration, the processor 704 may be of any type including but not limited to a microprocessor (µP), a microcontroller (µC), a digital signal processor (DSP), or any combination thereof. The processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more applications 722, and program data 724. An application 722 may include an analyzing/computing module 726 that is arranged to analyze and determine a cycle related to the computing resources expected to be employed by a representative user of an Internet service provider as described herein. The analyzing/computing module 726 can further compute a service fee for each instance of the cycle as described herein. The program data 724 may include the first set of information 728, as is described herein. In some embodiments, the application 722 may be arranged to operate with the program data 724 on the operating system 720 to flexibly provide cloud computing services. This described basic configuration 702 is illustrated in FIG. 7 by those components within the inner dashed line.

The computing device 700 may have additional features or functionality, and additional interfaces to facilitate communications between the basic configuration 702 and any required devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

The system memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. Example output devices 742 include a graphics processing unit 748 and an audio processing unit 750, which may be configured to communicate to various external devices such as a display or speakers via one or more NV ports 752. Example peripheral interfaces 744 include a serial interface controller 754 or a parallel interface controller 756, which may be configured to communicate with external devices such as input devices (e.g., a keyboard, a mouse, a pen, a voice input device, a touch input device, etc.) or other peripheral devices (e.g., a printer, a scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media. The term computer readable storage media as used herein does not include communication media.

The computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touchpad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological routines, it is to be understood that the subject matter defined in the appended claims is not necessarily limited to the specific features or routines described above. Rather, the specific features and routines described above are disclosed as example forms of implementing the claims. Accordingly, the invention is not limited except as by the appended claims.

We claim:

1. A method, comprising:
   receiving, at a cloud service provider, a first set of information comprising expected user behavior of a representative user of an Internet service provider that provides an Internet service, wherein the first set of information is received by the cloud service provider from the Internet service provider;

identifying one or more computing resources expected to be employed by the Internet service provided by the Internet service provider;

analyzing the first set of information to determine a cycle, wherein the cycle is a function of an amount of the one or more computing resources expected to be employed by the representative user of the Internet service provider;

computing a service fee for each instance of the cycle;

in response to detecting an actual cycle at a computing device assigned by the cloud service provider to the Internet service provider, allocating the service fee to the Internet service provider;

identifying a change in traffic for the Internet service provided by the Internet service provider; and allocating the one or more computing resources to the Internet service provider based on the change in traffic.

2. The method of claim 1, further comprising monitoring the computing device and adjusting the service fee based on a comparison of one or more computing resources actually employed by the Internet service and the one or more computing resources expected to be employed by the Internet service.

3. The method of claim 2, wherein monitoring the computing device further comprises monitoring computing resources of the computing device.

4. The method of claim 3, wherein the monitored computing resources comprise one or more of a processor, a memory, a storage device, an input/output device, or a network communication device.

5. The method of claim 1, wherein analyzing the first set of information to determine the cycle comprises computing an average usage amount of at least some of one or more computing resources actually employed by the Internet service.

6. The method of claim 1, further comprising providing multiple service fee packages for the Internet service provider to select from, wherein at least some of the multiple service fee packages are based on different expected usages of the one or more computing resources.

7. The method of claim 6, wherein the multiple service fee packages comprise a High-Storage package based on expected usage of storage devices, a High-Bandwidth package based on expected usage of network communication devices, and a High-Processing package based on expected usage of processors.

8. A system, comprising:
an input device, configured to receive, at a cloud service provider, a first set of information comprising expected user behavior of a representative user of an Internet service provider that provides an Internet service, wherein the first set of information is received by the cloud service provider from the Internet service provider; and a processor coupled to the input device, the processor comprising:
an identification module configured to identify one or more computing resources expected to be employed by the Internet service provided by the Internet service provider;
an analysis module configured to analyze the first set of information to determine a cycle, wherein the cycle is a function of an amount of the one or more computing resources expected to be employed by the representative user of the Internet service provider;
a computing module configured to compute a service fee for each instance of the cycle; and a fee allocating module, in response to detection of an actual cycle at a computing device assigned by the cloud service provider to the Internet service provider, configured to allocate the computed service fee to the Internet service provider,
wherein the processor is configured to identify a change in traffic for the Internet service provided by the Internet service provider, and allocate the one or more computing resources to the Internet service provider based on the change in traffic.

9. The system of claim 8, further comprising:
a monitoring module configured to monitor the computing device; and
an adjusting module configured to adjust the service fee based on a comparison of one or more computing resources actually employed by the Internet service and the one or more computing resources expected to be employed by the Internet service.

10. The system of claim 9, wherein the monitoring module is configured to monitor computing resources of the computing device.

11. The system of claim 10, wherein the monitored computing resources comprise one or more of a processor, a memory, a storage device, an input/output device, or a network communication device.

12. The system of claim 8, wherein the analysis module is further configured to compute an average usage amount of at least some of one or more computing resources actually employed by the Internet service.

13. The system of claim 8, further comprising a service package module configured to generate multiple cycle-based service fee packages for the Internet service provider to select from.

14. The system of claim 13, wherein the multiple cycle-based service fee packages comprise a High-Storage package based on expected usage of storage devices and a High-Bandwidth package based on expected usage of network processors.

15. A non-transitory computer-readable storage device storing computer-readable instructions, the instructions in response to execution by a processor, cause the processor to perform or control performance of operations to:
receive, at a cloud service provider, a first set of information comprising expected user behavior of a representative user of at least one Internet service provider from a plurality of Internet service providers that provide Internet services;
identify one or more computing resources expected to be employed by the Internet services provided by the plurality of Internet service providers;
analyze the first set of information to determine a cycle for at least some of the plurality of Internet service providers, wherein the cycle is a function of an amount of the one or more computing resources expected to be employed by the representative user;
provide multiple service fee packages for the plurality Internet service providers to select from;
compute a service fee for users of the plurality of Internet service providers based on a selected service fee package;
allocate the service fee to at least one of the plurality Internet service providers in response to detecting an actual cycle at a computing device assigned by the cloud service provider to the at least one Internet service provider;

identify a change in traffic for at least one of the Internet services provided by the at least one Internet service provider; and allocate the one or more computing resources to the at least one Internet service provider based on the change in traffic.

16. The computer-readable storage device of claim 15, wherein the instructions further comprise instructions that in response to execution by the processor, cause the processor to perform or control performance of operations to monitor the computing device and to adjust the service fee based on a comparison of one or more computing resources actually employed by an individual Internet service and the one or more computing resources expected to be employed by the individual Internet service.

17. The computer-readable storage device of claim 16, wherein the instructions to monitor the computing device further comprise instructions to monitor computing resources of the computing device.

18. The computer-readable storage device of claim 17, wherein the monitored computing resources comprise one or more of a processor, a memory, a storage device, an input/output device, or a network communication device.

19. The computer-readable storage device of claim 15, wherein the instructions to analyze the first set of information to determine the cycle comprise instructions to compute an average usage amount of at least some of computing resources employed by users of an individual Internet service provider.

20. The computer-readable storage device of claim 15, wherein the multiple service fee packages comprise a High-Storage package based on expected usage of storage devices, a High-Bandwidth package based on expected usage of network communication devices, and a High-Processing package based on expected usage of processors.

* * * * *

UNITED STATES PATENT AND TRADEMARK OFFICE
CERTIFICATE OF CORRECTION

Page 1 of 1

PATENT NO.        : 9,760,876 B2
APPLICATION NO.   : 13/855590
DATED             : September 12, 2017
INVENTOR(S)       : Cao et al.

It is certified that error appears in the above-identified patent and that said Letters Patent is hereby corrected as shown below:

In the Specification

In Column 9, Line 44, delete "NV ports" and insert -- A/V ports --, therefor.

In the Claims

In Column 14, Lines 58-59, in Claim 15, delete "plurality Internet" and insert -- plurality of Internet --, therefor.

In Column 14, Lines 63-64, in Claim 15, delete "plurality Internet" and insert -- plurality of Internet --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*